(12) United States Patent
Robinson

(10) Patent No.: US 10,932,407 B2
(45) Date of Patent: Mar. 2, 2021

(54) FLOATING POND FERTILIZER DEVICE

(71) Applicant: Jerry Robinson, Thomasville, AL (US)

(72) Inventor: Jerry Robinson, Thomasville, AL (US)

( * ) Notice: Subject to any disclaimer, the term of this patent is extended or adjusted under 35 U.S.C. 154(b) by 312 days.

(21) Appl. No.: 16/114,416

(22) Filed: Aug. 28, 2018

(65) Prior Publication Data

US 2020/0068795 A1 Mar. 5, 2020

(51) Int. Cl.
| | | |
|---|---|---|
| *A01C 15/08* | (2006.01) | |
| *A01C 15/00* | (2006.01) | |
| *A01K 63/04* | (2006.01) | |
| *A01C 21/00* | (2006.01) | |

(52) U.S. Cl.
CPC ............ *A01C 15/08* (2013.01); *A01C 15/005* (2013.01); *A01C 21/00* (2013.01); *A01K 63/04* (2013.01)

(58) Field of Classification Search
CPC ........ A01C 15/08; A01C 15/005; A01K 63/04
USPC ....................................... 422/265; 210/747.5
See application file for complete search history.

(56) References Cited

U.S. PATENT DOCUMENTS

| | | |
|---|---|---|
| 3,939,802 A | 2/1976 | Neff |
| 4,372,252 A | 2/1983 | Lowry, Jr. |
| 4,967,697 A | 11/1990 | Lau |
| 5,143,020 A | 9/1992 | Patrick |
| 5,212,904 A | 5/1993 | Green et al. |
| 5,235,774 A | 8/1993 | Burghoff |
| 5,337,698 A | 8/1994 | Widmyer |
| 5,720,124 A | 2/1998 | Wentzell |
| 6,070,554 A | 6/2000 | Wilson |
| 6,503,467 B1 * | 1/2003 | Robinson, Sr. ........ A01K 63/04 137/268 |
| 9,713,323 B2 | 7/2017 | Jenkins et al. |
| 2005/0183331 A1 | 8/2005 | Kania et al. |

(Continued)

FOREIGN PATENT DOCUMENTS

| | | |
|---|---|---|
| BR | MU9001725-0 U2 | 1/2013 |
| DE | 9308020.4 | 7/1993 |
| DE | 19833471 C2 | 7/2002 |

(Continued)

OTHER PUBLICATIONS

The Water Garden, "Fish Feeder / Viewer (2 Foot Diameter)", available at http://www.watergarden.org/Large-Fish-Feeder-Viewer, retrieved on Jul. 4, 2018.

(Continued)

*Primary Examiner* — Kevin Joyner
(74) *Attorney, Agent, or Firm* — Adamsip, LLC; J. Hunter Adams

(57) ABSTRACT

A floating pond fertilizer device is provided. The device includes a tray for holding fertilizer at the surface of a body of water to be fertilized. The tray has small holes in the bottom of the tray through which fertilizer is released and is secured to a float to support the tray on the surface of the water. The device has opposing mixing arms positioned inside the tray for mixing the fertilizer. The mixing arms are attached to a support arm that can freely rotate within an opening in the center of the bottom of the tray. Rotation of the support arm is facilitated by natural wind and wave action, and thus the device does not require the use of motorized or automated components for mixing or dispensing the fertilizer.

7 Claims, 2 Drawing Sheets

(56) References Cited

U.S. PATENT DOCUMENTS

2010/0139148 A1    6/2010  Barker
2016/0316726 A1  11/2016  Birger

FOREIGN PATENT DOCUMENTS

| GB | 1216912 | 12/1970 |
|----|---------|---------|
| IN | 201741010341 | 4/2017 |
| WO | 2010120181 | 10/2010 |
| WO | 2011147140 | 12/2011 |

OTHER PUBLICATIONS

Pond King, "PK Floating Fish Feeder", available at http://www.pondking.com/product/pk-floating-fish-feeder/?gclid=EAlalQobChMl6_f_puqF3AIVTb7ACh2-zAHkEAAYASAAEgK5rvD_BwE, retrieved on Jul. 4, 2018.

Velda, "Fish Food Scoop", available at https://www.velda.com/pond-products/fish/feeding-devices/fish-food-scoop/, retrieved on Jul. 4, 2018.

\* cited by examiner

FLOATING POND FERTILIZER DEVICE

FIELD OF THE INVENTION

The present disclosure refers generally to a floating pond fertilizer device and a method of using the device to fertilize a pond.

BACKGROUND

Pond fertilizer may be utilized to fertilize a pond, lake, or similar body of water in order to increase fish production from the pond. The fertilizer provides nutrients that stimulate the growth of algae and other aquatic plant life that provide feed for many types of small aquatic animals that larger fish prey on. By increasing the amount of prey in the pond, fertilizer may be utilized to increase the number of fish and/or the size of fish, sometimes by as much as three to four times the number of fish naturally produced without using fertilizer. In order to fertilize a pond, a certain amount of fertilizer must be applied to the water over a period of time. A steady, controlled release of fertilizer is preferred in order to maximize the efficacy of the fertilizer and minimize overuse of fertilizer.

Various types of devices for distributing fertilizer in a body of water are known in the art. However, there are problems and disadvantages with known fertilizing devices. Some devices utilize electric motors for automated distribution of fertilizer. These devices require a power source such as a battery as well as other electronic components, which are subject to failure and also make such devices more expensive to purchase and operate. Fertilizer devices that do not include a motor are often not effective in releasing fertilizer in a controlled manner over an extended period of time. Additionally, many devices do not include a means for mixing the fertilizer while the device is in use, which may cause the fertilizer to form clumps that do not distribute as easily or effectively. Non-motorized devices, in particular, generally do not have any type of mixers for mixing the fertilizer contained within the device prior to distribution.

Accordingly, a need exists in the art for a pond fertilizer device that effectively releases fertilizer in a controlled manner over an extended period of time and that is not motorized.

SUMMARY

In one aspect, a floating pond fertilizer device is provided. The device comprises a tray for holding granular fertilizer for fertilizing a pond or similar body of water. The tray is secured to a float that supports the tray to keep the tray on the surface of the water. The float is preferably a floatation ring that circumscribes the tray. The float is arranged to support the tray in an upright position with the bottom of the tray contacting water when the device is floating with the tray weighted with fertilizer. The bottom of the tray has a plurality of holes extending through the bottom, which allow a controlled release of the fertilizer contained in the tray through the holes in the bottom of the tray.

The device further comprises a support arm extending through a central opening in the bottom of the tray. The support arm has a top end positioned above the bottom of the tray and a bottom end positioned below the bottom of the tray. Two opposing mixing arms are each attached to the top end of the support arm at an angle to the support arm, which is preferably a 90-degree angle, and each disposed within an interior of the tray. The support arm is free to rotate within the central opening so that the opposing mixing arms will mix the granular fertilizer contained in the tray when the support arm is rotated. An anchor arm is attached at one end to the bottom end of the support arm at an angle to the support arm, which is preferably a 90-degree angle. An anchor is connected to the anchor arm via an anchor line that is secured to an end of the anchor arm opposite the end of the anchor arm attached to the bottom end of the support arm. In a preferred embodiment, the device also includes a wind fan that extends upward from the device when the device is floating. The wind fan catches wind in order to cause the device to rotate when floating on the surface of the water.

To use the device to fertilize a pond, fertilizer is added into the tray, and the device is set in the pond and anchored. Once anchored, the natural action of the wind and water cause the floating device to move on the surface of the water. The wind fan causes both the float and the tray secured thereto to rotate on the water surface while the anchor line pulls on the anchor arm to which the line is secured. These actions cause an arm assembly, which includes the support arm, anchor arm, and mixing arms, to rotate relative to the tray and the float, thereby mixing the fertilizer contained within the tray as the fertilizer is slowly released through the holes in the bottom of the tray. The mixing of the fertilizer with the mixing arms helps to provide a controlled release of an effective quantity of fertilizer without the use of a motor or other automated means of dispensing or mixing the fertilizer.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
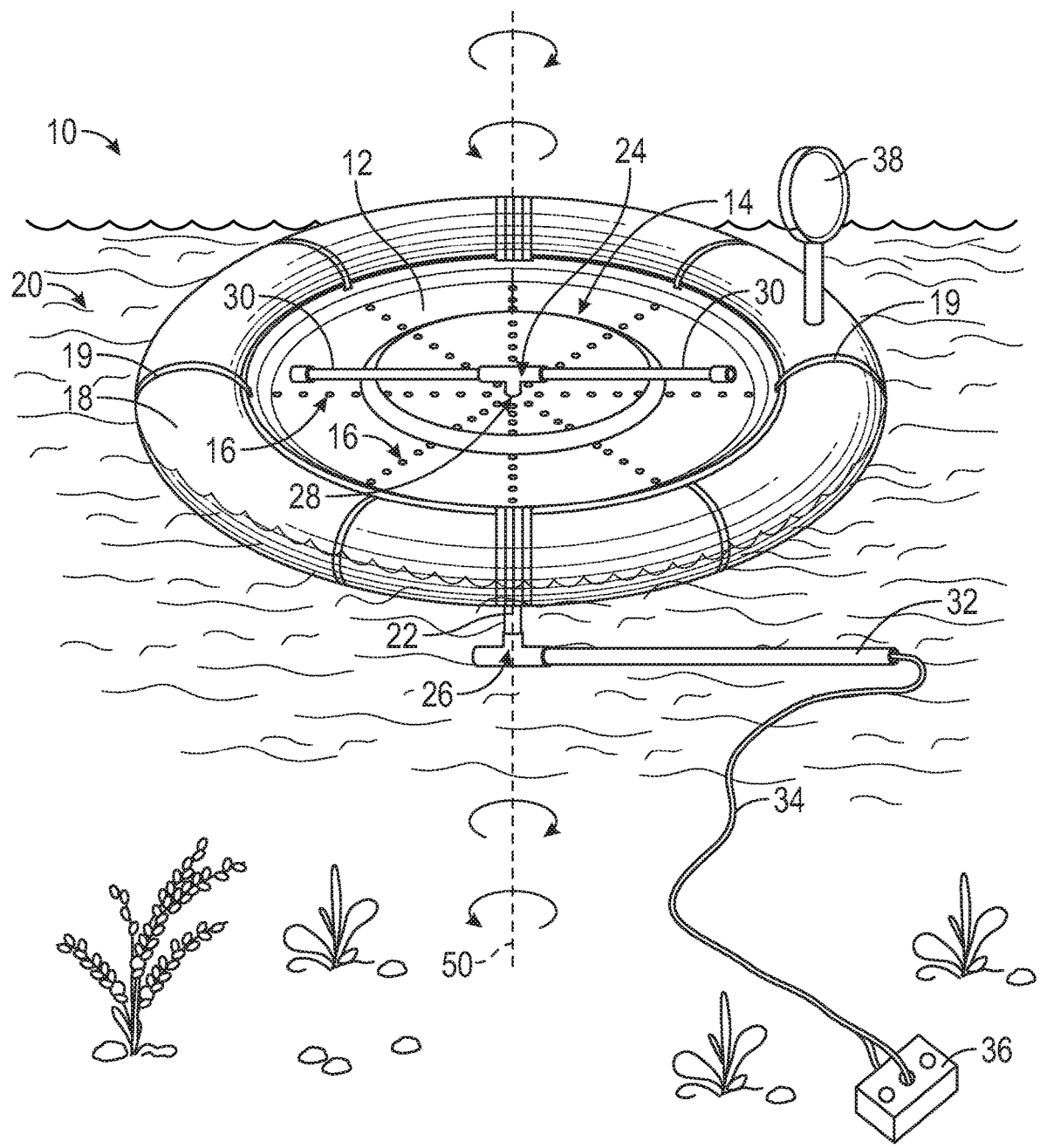
FIG. 1 shows a perspective view of a floating pond fertilizer device in accordance with the present disclosure, with the device floating in a body of water but without fertilizer added to the device.
Figure 2:
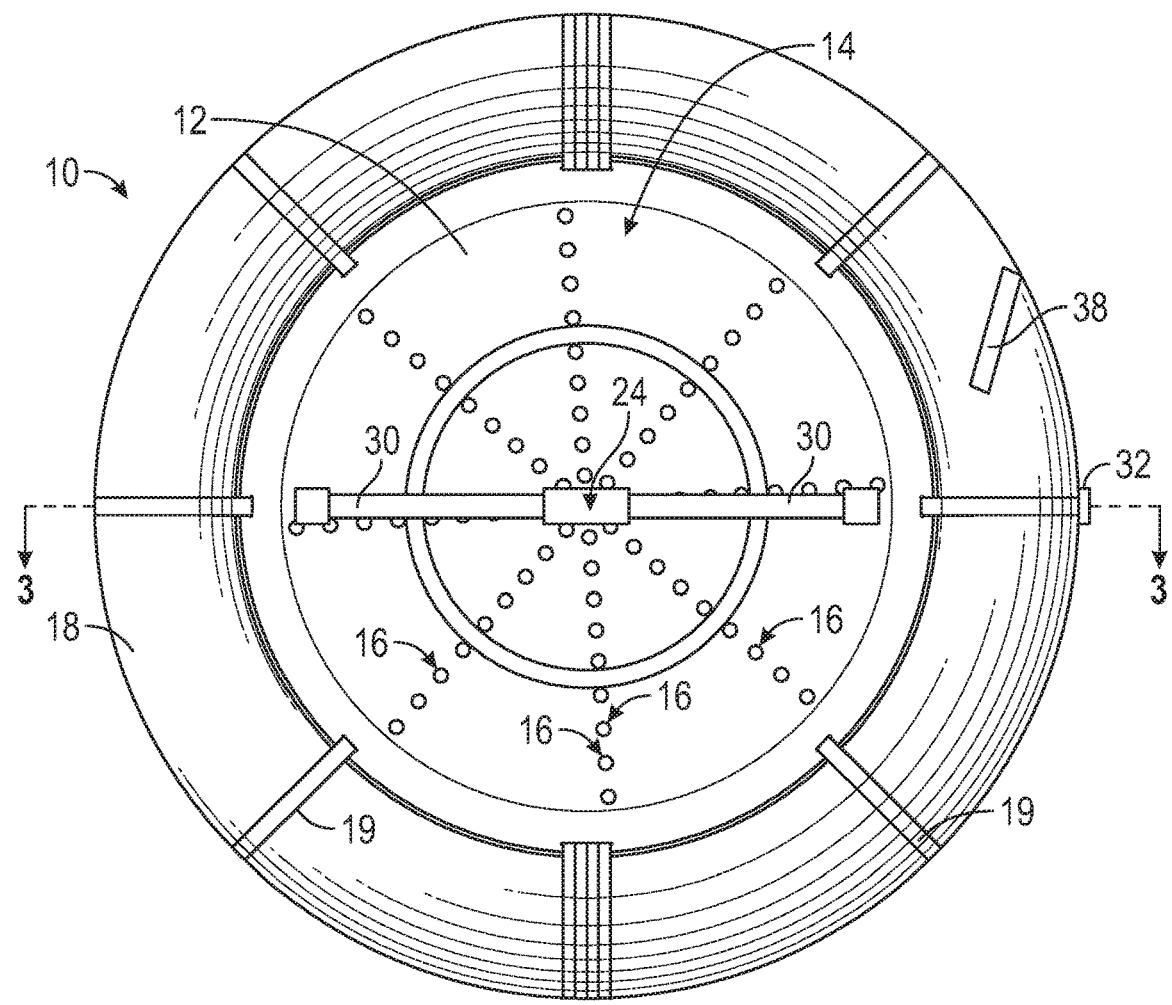
FIG. 2 shows a top plan view of a floating pond fertilizer device in accordance with the present disclosure.
Figure 3:
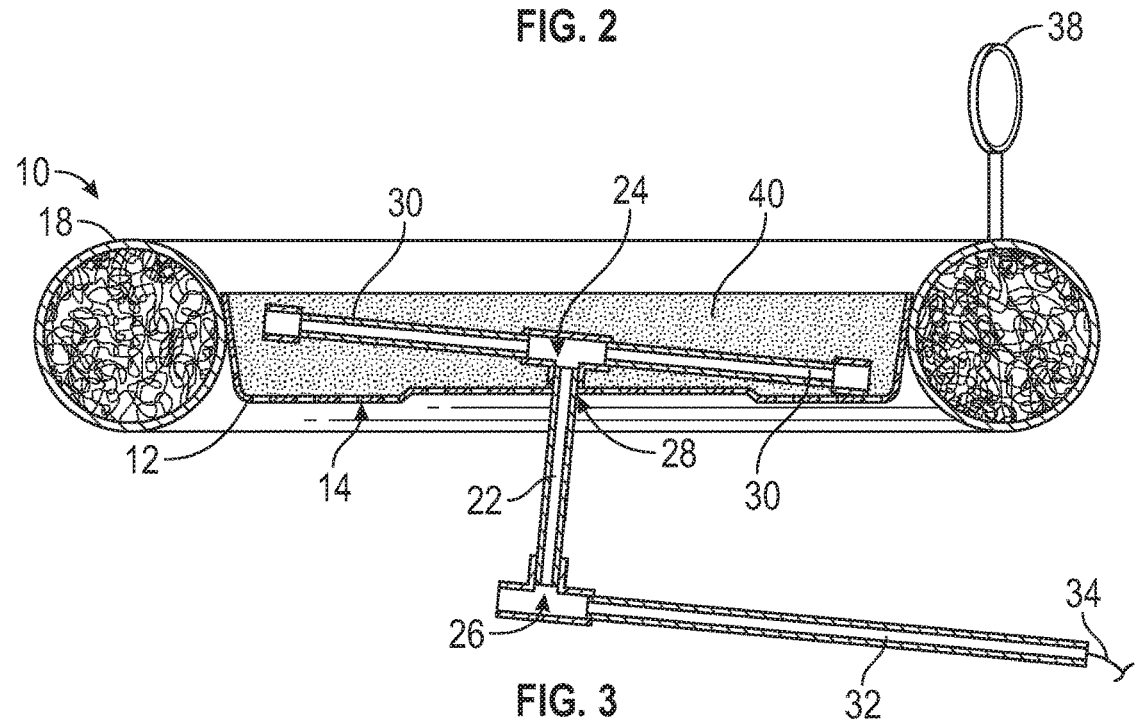
FIG. 3 shows a cross-sectional view along line 3-3 of a floating pond fertilizer device with fertilizer added to the device in accordance with the present disclosure.

In one aspect, a floating pond fertilizer device 10 is provided. FIG. 1 illustrates the device 10 floating on the surface of water 20 in an upright position suitable for normal use. For ease of illustration of various components of the device 10, FIG. 1 shows the device 10 before fertilizer is added for normal use. The device 10 comprises a tray 12 for holding granular fertilizer 40 for fertilizing a pond or similar body of water. The tray 12 has a bottom 14 with a plurality of small holes 16 extending through the bottom 14. The holes 16 may be arranged in a desired pattern, as shown in FIG. 2. The tray 12 is secured to a float 18 that supports the tray 12 to keep the tray 12 on the surface of the water 20 when in use. The float 18 is arranged to support the tray 12 in an upright position, as best illustrated in FIGS. 1 and 3, with the bottom 14 of the tray 12 contacting water 20 when the device 10 is floating with the tray 12 weighted with fertilizer 40, as shown in FIG. 3. In a preferred embodiment, as best illustrated in FIGS. 1 and 2, the float 18 is a floatation ring that circumscribes, or completely surrounds, the tray 12. Both the float 18 and the tray 12 are preferably circular, though other geometries may be utilized. The tray 12 may be secured to the float 18 by a plurality of fasteners 19, which may include rope, string, cords, wire, plastic cable ties, or similar types of fasteners secured to both the float 18 and to the tray 12. The fasteners 19 may be looped around the floatation ring 18 and passed through openings disposed around a perimeter of a side wall of the tray 12 with opposing ends of the fasteners secured to each other. Alternatively, other suitable types of fasteners may be utilized for securing the tray 12 to the float 18. The float 18 preferably includes polyethylene foam disposed within the interior of the float, as shown in FIG. 3, or a similar material suitable for floatation.

The device 10 further comprises a support arm 22 extending through a central opening 28 in the bottom 14 of the tray 12. The support arm 22 has a top end 24 positioned above the bottom 14 of the tray 12 and a bottom end 26 positioned below the bottom 14 of the tray 12, as best seen in FIGS. 1 and 3. Two opposing mixing arms 30 are each attached to the top end 24 of the support arm 22 at an angle to the support arm 22. Preferably, each mixing arm 30 is attached at a 90-degree angle to the support arm 22. When the device 10 is assembled, the mixing arms 30 are disposed within an interior of the tray 12 for mixing fertilizer 40 contained within the tray 12. The support arm 22 is free to rotate within the central opening 28 about axis 50, as indicated by the arrows shown in FIG. 1, so that the opposing mixing arms 30 will mix the granular fertilizer 40 contained within the tray 12 when the support arm 22 is rotated relative to the tray 12 and the float 18.

An anchor arm 32 is attached at one end of the anchor arm 32 to the bottom end 26 of the support arm 22 at an angle to the support arm 22. Preferably, as best shown in FIGS. 1 and 3, the anchor arm 32 is positioned at a 90-degree angle to the support arm 22. Thus, the support arm 22, anchor arm 32, and opposing mixing arms 30 form an arm assembly that may rotate relative to the tray 12 and the float 18 with the support arm 22 rotating within the central opening 28 in the bottom 14 of the tray 12. The arm assembly may be constructed of any suitable material such as metal or plastic. In a preferred embodiment, as shown in FIGS. 1-3, the arm assembly is constructed of polyvinyl chloride (PVC) pipe connected together by PVC fittings, which provides a lightweight, inexpensive construction material. Thus, the top end 24 of the support arm 22 may be defined by a tee fitting that connects the support arm 22 to each of the two opposing mixing arms 30, which are preferably at a 180-degree angle to each other, as shown in FIG. 1. In an alternative embodiment, the device 10 may comprise more than two mixing arms 30, and a fitting for connecting more than two mixing arms 30 to the support arm 22 may be utilized at the top end 24 of the support arm 22. The central opening 28 may be sized such that it has a diameter slightly larger than a diameter of the support arm 22 but slightly smaller than a diameter of the tee fitting connected to the support arm 22. This arrangement allows the support arm 22 to rotate freely within the central opening 28 while supporting the tee fitting that connects the mixing arms 30 to the support arm 22 above the bottom 14 of the tray 12, which thereby supports both of the opposing mixing arms 30 slightly above the bottom 14 of the tray 12, as shown in FIG. 1. In addition, the bottom end 26 of the support arm 22 may be defined by a tee fitting or an elbow fitting to which the anchor arm 32 is connected at an angle to the support arm 22.

The anchor arm 32 is preferably at least six inches long, and more preferably at least 12 inches long. In a preferred embodiment, the tray 12 and the floatation ring 18 are circular, and the tray 12 has a radius extending from the central opening 28 to an outer perimeter of the tray 12 supported by the floatation ring 18, as best seen in FIG. 2. In a preferred embodiment, as best shown in FIGS. 1 and 3, the anchor arm 32 has a length at least as long as the radius of the tray 12 so that the anchor arm 32 extends at least to the perimeter of the tray 12, and more preferably to the perimeter of the floatation ring 18.

As shown in FIG. 1, an anchor 36 is connected to the anchor arm 32 via an anchor line 34 that is secured to an end of the anchor arm 32 opposite the end of the anchor arm 34 that is attached to the bottom end 26 of the support arm 22. The anchor 36 rests on a water bottom and prevents the tray 12 and float 18 from drifting out of a fertilization zone of the body of water as determined by the length of the anchor line 34, which may be adjusted as needed. The anchor 36 may be any suitably heavy object, including commonly available items, such as a brick, as shown in FIG. 1.

In a preferred embodiment, the device 10 also includes a wind fan 38 that extends upward from the device 10 when the device 10 is floating, as best shown in FIGS. 1 and 3. The wind fan 38 is preferably secured to the floatation ring 18. The wind fan 38 catches wind in order to cause the floatation ring 18 and the tray 12 secured thereto to rotate relative to the arm assembly, and particularly relative to the mixing arms 30, when the device 10 is floating on the surface of the water 20. In an illustrative embodiment shown in FIG. 1, the device 10 has only one wind fan 38. However, the device 10 may optionally have multiple wind fans 38, and may preferably have four wind fans positioned equidistantly around the floatation ring 38 so that there is always at least one wind fan 38 perpendicular to the direction of the wind to assist in causing rotation of the floatation ring 18 and the tray 12.

To use the device 10 to fertilize a pond, granular pond fertilizer 40 is added into the tray 12, as shown in FIG. 3. In a preferred embodiment, the tray 12 has a diameter and a depth sufficient to hold about 25 pounds of fertilizer, though the size and depth of the tray may be adjusted for different applications. In one embodiment, the depth of the tray 12 may be in the range of about 2-6 inches. Fertilizer 40 is added into the tray 12 so that the fertilizer 40 at least partially covers the mixing arms 30, as shown in FIG. 3, so that the mixing arms 30 will mix the fertilizer 40 when the support arm 22 to which the mixing arms 30 are attached rotates relative to the tray 12. With fertilizer 40 held in the tray 12, the device 10 is set in the pond to be fertilized so that the device 10 is floating with the tray 12 in an upright position with the bottom 14 of the tray 12 contacting water 20. The device 10 is anchored in place by the anchor 36. The float 18 should be sized to support the tray 12 with fertilizer 40 contained in the tray 12 so that an exterior surface of the bottom 14 of the tray 12 contacts the water 20 when the tray 12 and float 18 are weighted downward into the water 20 with fertilizer 40.

Once set in place and anchored, the device 10 is allowed to float in the body of water for a period of time, thereby allowing a controlled release of fertilizer 40 through the holes 16 in the bottom 14 of the tray 12. The holes 16 in the bottom 14 of the tray 12 allow water 20 to seep upward through the holes 16 and contact the fertilizer 40 contained in the tray 12, which allows the fertilizer 40 to be slowly released over an extended period of time. While floating, the natural action of wind and water 20 cause the float 18 and tray 12 to move on the surface of the water 20. The wind fan 38 causes both the float 18 and the tray 12 secured thereto to rotate on the water surface relative to the mixing arms 30 while the anchor line 34 pulls on the anchor arm 32 due to surface movement of the float 18 due to the wind and wave action. This pulling action may further assist in the relative rotational movement of the arm assembly. In addition, the anchor arm 32 having a length at least as long as a radius of the tray 12 may provide added leverage to cause relative rotational movement of the arm assembly. The pulling action in conjunction with wind action may cause the arm assembly, which includes the support arm 22, anchor arm 32, and mixing arms 30, to rotate relative to the tray 12, thereby mixing the fertilizer 40 contained within the tray while the fertilizer is slowly released through the holes 16 in the bottom 14 of the tray 12. The mixing of the fertilizer 40 with the mixing arms 30 helps to keep the granular fertilizer 40 from forming clumps, which may clog the holes 16 and prevent an adequate quantity of fertilizer from being released through the holes 16. Thus, the mixing action of the mixing arms 30 helps to provide a controlled release of an effective quantity of fertilizer 40 without the use of a motor or other automated means of dispensing or mixing the fertilizer.

As shown in FIG. 3, the support arm 22 may be free to vertically pivot within the central opening 28 in the bottom 14 of the tray 12. Thus, when the device 10 is floating in an upright position, the support arm 22 may be positioned at a slight angle to vertical axis 50. This vertical pivoting may be caused by the pulling action of the anchor line 34 pulling on the anchor arm 32 due to surface movement of the float 18 due to the wind and wave action. The anchor arm 32 having a length at least as long as a radius of the tray 12 may provide added leverage to cause vertical pivoting of the support arm 22. When the support arm 22 pivots vertically, this pivoting causes one of the opposing mixing arms 30 to be positioned lower than the opposite mixing arm 30, which may cause one mixing arm 30 to contact an interior surface of the bottom 14 of the tray 12, as shown in FIG. 3. When the mixing arms 30 rotate in this position relative to the tray 12, the rotation causes an end of one mixing arm 30 to scrape the bottom 14 of the tray 12, which generally assists further in preventing the formation of fertilizer clumps, particularly around the holes 16 in the tray 12. A central portion of the bottom 14 of the tray 12 may be slightly raised, as shown in FIG. 1, so that the lower of the two mixing arms 30 passes closer to the bottom 14 of the tray 12 when the mixing arms 30 rotate to facilitate breaking up fertilizer clumps.

The anchor 36 may optionally have a second line (not shown) secured thereto that runs from the anchor 36 to a stake or similar tie-down point located on a shore of the pond. This line may allow a user to pull the line to draw the anchor 36 to the shore, which thereby allows the user to access the device 10 from the shore without the necessity of using a boat. The user may then re-fill the tray 12 with fertilizer 40 as needed and then re-set the device 10 in the pond by pushing the re-filled tray 12 and floatation ring 18 out into the pond and then throwing the anchor 36 back to its previous location.

In accordance with an alternative method, the fertilizer 40 may be replaced with a granular material suitable for chumming, such as dog food. In this case, the device 10 operates in the same manner, but the material released through the holes 16 in the tray 12 is food that may be eaten directly by fish rather than fertilizer 40 that promotes the growth of aquatic plants. Even in small quantities, the released chum may attract game fish due to the scent released into the water. Thus, the present device 10 may be utilized for chumming when fishing in addition to fertilizing.

It is understood that versions of the invention may come in different forms and embodiments. Additionally, it is understood that one of skill in the art would appreciate these various forms and embodiments as falling within the scope of the invention as disclosed herein.

What is claimed is:

1. A method of fertilizing a body of water, said method comprising the steps of:
    providing a floating pond fertilizer device comprising:
        a tray having a bottom with a plurality of holes extending through the bottom, wherein the tray is secured to a float that is arranged to support the tray in an upright position with the bottom of the tray contacting water when the device is floating on water,
        a support arm extending through a central opening in the bottom of the tray, wherein the support arm is free to rotate within the central opening, and wherein the support arm has a top end positioned above the bottom of the tray and a bottom end positioned below the bottom of the tray,
        two opposing mixing arms each attached to the top end of the support arm at an angle to the support arm and each disposed within an interior of the tray,
        an anchor arm attached at one end to the bottom end of the support arm at an angle to the support arm, and
        an anchor connected to the anchor arm via an anchor line that is secured to an end of the anchor arm opposite the end of the anchor arm attached to the bottom end of the support arm;
    adding granular fertilizer into the tray;
    setting the device in a body of water to be fertilized so that the device is floating with the tray in an upright position and with the bottom of the tray contacting water while the device is anchored by the anchor; and allowing the device to float in the body of water for a period of time, thereby allowing a controlled release of fertilizer through the holes in the bottom of the tray to fertilize the body of water.

2. The method of claim 1, wherein the float is a floatation ring circumscribing the tray.

3. The method of claim 1, wherein the anchor arm has a length at least as long as a radius of the tray.

4. The method of claim 1, further comprising a wind fan that extends upward from the device when the device is floating on water.

5. The method of claim 1, wherein the support arm is free to vertically pivot within the central opening.

6. The method of claim 1, wherein each mixing arm is respectively attached to the support arm at a 90-degree angle to the support arm.

7. The method of claim 1, wherein the anchor arm is attached to the support arm at a 90-degree angle to the support arm.

* * * * *